United States Patent
Yune

(10) Patent No.: US 10,577,702 B2
(45) Date of Patent: Mar. 3, 2020

(54) ZINC COATING-FORMING METHOD FOR DRAWING OF METALLIC PIPES

(71) Applicant: HAN SUNG MINUTENESS STEEL PIPE CO., LTD., Goryeong-gun, Gyeongsangbuk-do (KR)

(72) Inventor: Chan Sic Yune, Daegu (KR)

(73) Assignee: HAN SUNG MINUTENESS STEEL PIPE CO., LTD., Goryeong-gun (KR)

(*) Notice: Subject to any disclaimer, the term of this patent is extended or adjusted under 35 U.S.C. 154(b) by 95 days.

(21) Appl. No.: 15/802,503

(22) Filed: Nov. 3, 2017

(65) Prior Publication Data
US 2018/0127889 A1    May 10, 2018

(30) Foreign Application Priority Data
Nov. 4, 2016   (KR) .................. 10-2016-0146848

(51) Int. Cl.
*B05D 3/02*    (2006.01)
*B05D 1/36*    (2006.01)
(Continued)

(52) U.S. Cl.
CPC .............. *C25D 3/22* (2013.01); *C23C 8/02* (2013.01); *C23C 8/10* (2013.01); *C23C 28/3225* (2013.01); *C23G 1/02* (2013.01); *C23G 1/20* (2013.01); *C23G 1/22* (2013.01); *C25D 9/06* (2013.01); *C25D 11/12* (2013.01); *C25D 11/16* (2013.01); *C25D 11/36* (2013.01); *C25D 17/10* (2013.01);
(Continued)

(58) Field of Classification Search
CPC .......... B05D 7/146; C23C 4/06; C23C 28/345
USPC ..... 427/318, 402, 419.3; 205/213, 215, 219, 205/171, 172, 176, 177, 183, 185, 198, 205/199, 201
See application file for complete search history.

(56) References Cited

U.S. PATENT DOCUMENTS 2,921,865 A * 1/1960 Kubie ................... C23C 22/83
                                                        148/246
4,138,348 A * 2/1979 Grasshoff ............ C10M 173/00
                                                        508/157
(Continued)

FOREIGN PATENT DOCUMENTS

JP         04013894 A  *  1/1992  ............ C25D 11/04
JP      2000-144494 A       5/2000
(Continued)

OTHER PUBLICATIONS

Jegannathan et al., "Formation and Characteristics of Zinc Phosphate Coatings Obtained by Electrochemical Treatment: Cathodic vs. Anodic," Progress in Organic Coatings (2009), vol. 65, pp. 229-236. (Year: 2009).*
(Continued)

*Primary Examiner* — Edna Wong
(74) *Attorney, Agent, or Firm* — Studebaker & Brackett PC

(57) ABSTRACT

The present invention provides a zinc coating-forming method for drawing of metallic pipes, including a degreasing step of degreasing a material to be drawn, which is composed of any one of aluminum, an aluminum alloy, copper, and a copper alloy; a first oxidation step of forming an oxide coating on a surface of the material to be drawn, which has been degreased in the degreasing step; and a second oxidation step of forming a zinc coating on the material to be drawn, which has been coated with an oxide.

15 Claims, 2 Drawing Sheets

(51) Int. Cl.
*C25D 5/44* (2006.01)
*C25D 5/34* (2006.01)
*C25D 5/00* (2006.01)
*C25D 11/04* (2006.01)
*C25D 5/10* (2006.01)
*C23C 28/00* (2006.01)
*C23C 28/02* (2006.01)
*C25D 3/22* (2006.01)
*C25D 11/16* (2006.01)
*C25D 11/12* (2006.01)
*C23G 1/20* (2006.01)
*C25D 11/36* (2006.01)
*C23G 1/22* (2006.01)
*C23C 8/02* (2006.01)
*C23C 8/10* (2006.01)
*C23G 1/02* (2006.01)
*C25D 9/06* (2006.01)
*C25D 17/10* (2006.01)
*F16L 9/02* (2006.01)
*C25D 21/02* (2006.01)
*C25D 11/08* (2006.01)

(52) U.S. Cl.
CPC .............. *F16L 9/02* (2013.01); *C25D 11/08* (2013.01); *C25D 21/02* (2013.01)

(56) References Cited

U.S. PATENT DOCUMENTS 4,477,290 A * 10/1984 Carroll .................. C23G 1/22
  134/2
5,245,847 A *  9/1993 Bando .................... C25D 5/44
  205/139

FOREIGN PATENT DOCUMENTS

| | | |
|---|---|---|
| JP | 2005-082848 A | 3/2005 |
| JP | 2008-215473 A | 9/2008 |
| KR | 10-0736596 B1 | 7/2007 |
| KR | 10-1226694 B1 | 1/2013 |

OTHER PUBLICATIONS

DeMeo et al., "Electrodeposited Copper Oxide and Zin Oxide Core-Shell Nanowire Photovoltaic Cells," Nanowires—Implementations and Applications (Jul. 18, 2011), pp. 141-156. (Year: 2011).*

* cited by examiner

ZINC COATING-FORMING METHOD FOR DRAWING OF METALLIC PIPES

CROSS-REFERENCE TO RELATED APPLICATION

This application claims priority to and the benefit of Korean Patent Application No. 10-2016-0146848, filed on Nov. 4, 2016, the disclosure of which is incorporated herein by reference in its entirety.

BACKGROUND

1. Field of the Invention

The present invention relates to a zinc coating-forming method for drawing of metallic pipes, and more specifically, to a zinc coating-forming method for drawing of metallic pipes in which a zinc coating may be stably formed on a surface of a material to be drawn, which consists of aluminum or an aluminum alloy.

2. Discussion of Related Art

In general, a drawing process refers to a method of pulling a metal rod, wire, or tube through a die and making a rod, wire, or tube having a cross section with the same shape as a hole of the die, and usually, cold rolling is performed, but a drawing process is performed at high temperature for tungsten, molybdenum, etc.

In a conventional die for drawing raw materials such as rods, wires, etc., a raw material is passed through a tapered surface of a die to pass through a small-diameter portion, and pulled in one direction with a drawing chuck from the front to obtain a drawn material.

In this case, conventionally, oil must be continuously supplied to a die and raw material at the time of drawing the raw material. However, since a separate oil supply device must be installed at the die, there is a disadvantage of increased production facility costs. Further, conventionally, in the case of aluminum or an aluminum alloy as the raw material for drawing, aluminum does not chemically react with zinc, and therefore, it is difficult to form a phosphate-based zinc coating on a surface, and even if a zinc coating is formed on a surface of the raw material, the zinc coating becomes discolored and turns black.

PRIOR ART REFERENCE

[Patent Document]
(Patent Document 1) Korean Registered Patent Publication No. 10-1226694: Aluminum Alloy Tube and Drawing Device Thereof

SUMMARY OF THE INVENTION

The present invention is directed to improving the above problems, and it is an object of the present invention to provide a zinc coating-forming method for drawing of metallic pipes, in which a phosphate-based zinc coating can be stably formed on a surface of a material to be drawn which consists of aluminum or an aluminum alloy, and the material to be drawn is subjected to a lube process.

In order to achieve the above object, the zinc coating-forming method for drawing of metallic pipes according to the present invention includes a degreasing step of degreasing a material to be drawn, which consists of any one of aluminum, an aluminum alloy, copper, and a copper alloy; a first oxidation step of forming an oxide coating on a surface of the material to be drawn, which has been degreased in the degreasing step; and a second oxidation step of forming a zinc coating on the material to be drawn which has been coated with an oxide.

The degreasing step is carried out by immersing the material to be drawn in a degreasing agent including ethylene diamine tetra acetic acid (EDTA) and potassium hydroxide for a predetermined immersion time.

The degreasing agent consists of 10 wt % to 15 wt % of the ethylene diamine tetra acetic acid, 2 wt % to 4 wt % of the potassium hydroxide, 10 wt % to 15 wt % of a surfactant, with the remainder as water.

The second oxidation step is carried out by forming a zinc coating on the material to be drawn by anodic oxidation.

The second oxidation step includes an electrolytic bath preparation step of preparing an electrolytic bath containing a coating agent including phosphoric acid and zinc; an installation step of installing a conductive plate and the material to be drawn so as to be immersed in the coating agent, in the electrolytic bath; and a voltage application step of applying a voltage of a negative electrode to the conductive plate installed in the electrolytic bath and applying a voltage of a positive electrode to the material to be drawn to form a zinc coating on the material to be drawn.

The coating agent consists of 20 wt % to 30 wt % phosphoric acid ($H_3PO_4$), 5 wt % to 10 wt % zinc oxide (ZnO), 10 wt % to 15 wt % nitric acid ($HNO_3$), with the remainder as water.

Meanwhile, in order to prevent hydrogen gas, which is generated when a voltage is applied to the conductive plate and the material to be drawn which are immersed in the coating agent, from interfering with the formation of the zinc coating, it is preferable to add an accelerant to the coating agent in the electrolytic bath preparation step to remove the hydrogen gas in the coating agent.

It is preferable that the accelerant includes sodium nitrite ($NaNO_2$) and sodium phosphate ($Na_3H_2PO_4$).

The accelerant consists of 30 wt % to 40 wt % sodium nitrite, 5 wt % to 10 wt % sodium phosphate, with the remainder as water.

It is preferable that the first oxidation step is carried out to form an oxide coating on the material to be drawn by anodic oxidation.

The first oxidation step includes a first container preparation step of preparing a first container containing a first electrolyte including sulfuric acid; a first setting step of installing a first electrode and the material to be drawn so as to be immersed in the first electrolyte, in the first container; and a first coating formation step of forming an oxide coating on the material to be drawn by applying a voltage of a negative electrode to the first electrode installed in the first container and applying a voltage of a positive electrode to the material to be drawn.

Meanwhile, it is preferable that the zinc coating-forming method for drawing of metallic pipes according to the present invention further includes a pretreatment step of forming an oxide coating on a surface of the material to be drawn, before the degreasing step.

The pretreatment step includes a second container preparation step of preparing a second container containing a second electrolyte including sulfuric acid; a second setting step of installing a second electrode and the material to be drawn so as to be immersed in the second electrolyte, in the second container; and a second coating formation step of forming an oxide coating on the material to be drawn by applying a voltage of a negative electrode to the second electrode installed in the second container and applying a voltage of a positive electrode to the material to be drawn.

Meanwhile, it is preferable that the zinc coating-forming method for drawing of metallic pipes according to the present invention further includes a lube step of lubricating the material to be drawn which has been coated with zinc, after the second oxidation step.

The lube process is carried out by immersing the material to be drawn, which has been coated with zinc, in a lubricant including stearic acid ($C_{18}H_{36}O_2$) and caustic soda (NaOH) for a predetermined time.

The lubricant consists of 10 wt % to 20 wt % of the stearic acid, 5 wt % to 7 wt % of the caustic soda, 10 wt % to 20 wt % borax ($Na_2B_4O_7.10H_2O$), with the remainder as water.

In addition, it is preferable that the zinc coating-forming method for drawing of metallic pipes according to the present invention further includes a borax application step of applying borax on a surface of the material to be drawn between the second oxidation step and the lube step.

In the zinc coating-forming method for drawing of metallic pipes according to the present invention, a material to be drawn is degreased before the formation of a zinc coating, and an oxide coating is formed on a surface thereof by sulfuric acid so that a phosphate-based zinc coating can be formed more stably on a surface of a material to be drawn, and the zinc coating can be subjected to a lube process so that there is an advantage in that no separate oil supply means is required for drawing dies.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
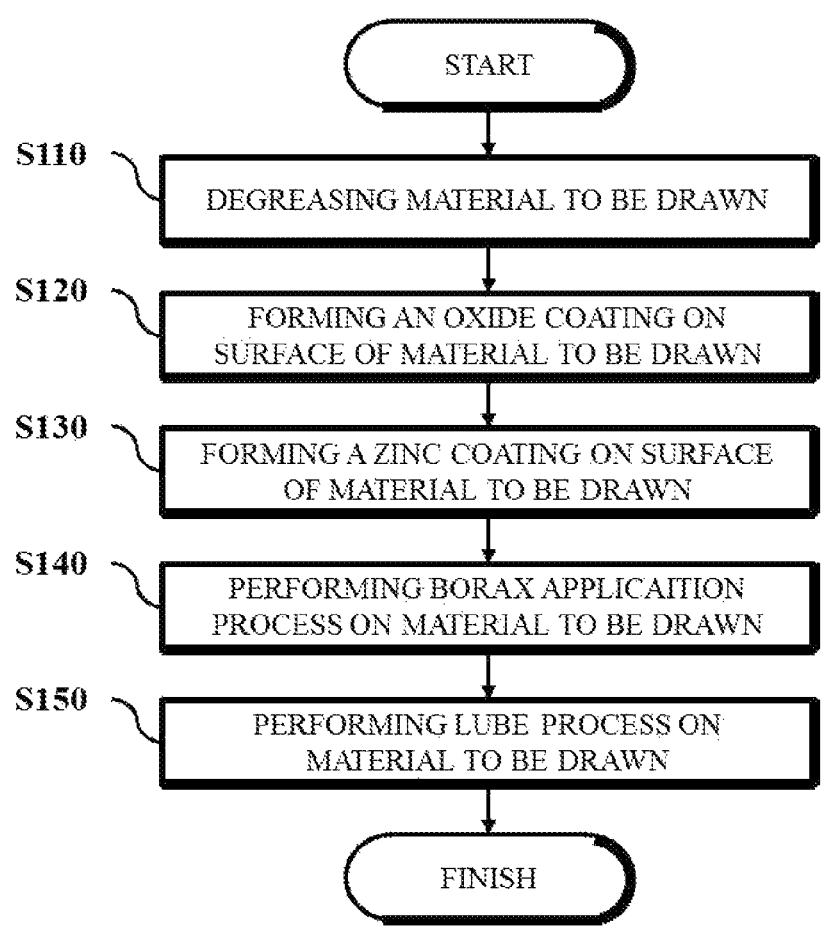
FIG. 1 is a flowchart illustrating the zinc coating-forming method for drawing of metallic pipes according to an exemplary embodiment of the present invention.

Hereinafter, the zinc coating-forming method for drawing of metallic pipes according to exemplary embodiments of the present invention will be explained in detail with reference to the accompanying drawings. While the invention is susceptible to various modifications and alternative forms, specific embodiments thereof are shown by way of example in the drawings and will herein be described in detail. It should be understood, however, that the invention is not intended to be limited to the particular forms disclosed, but on the contrary, is intended to cover all modifications, equivalents, and alternatives falling within the spirit and scope of the invention. Like reference numerals are used for similar elements in describing each drawing. In the accompanying drawings, the dimensions of the structures are enlarged to illustrate the present invention for the sake of clarity.

The terms such as "first", "second", etc. may be used to describe various elements, but the elements should not be limited by the terms. The terms are used only for the purpose of distinguishing one component from another. For example, without departing from the scope of the present invention, a first component may be referred to as a second component, and similarly, a second component may also be referred to as a first component.

The terminology used herein is for the purpose of describing particular embodiments only and is not intended to be limiting the invention. The singular expressions such as "a", "an", and "the" include plural expressions unless the context clearly dictates otherwise. In the present specification, the terms such as "comprising", "including", etc. as used herein are for purposes of specifying the presence of features, numbers, steps, operations, components, parts, or combinations thereof, which are disclosed in the specification, but it should be understood that the terms do not preclude beforehand the presence or addition of one or more other features, numbers, steps, operations, components, parts, or combinations thereof.

Unless defined otherwise, all terms used herein, including technical or scientific terms, have the same meanings as commonly understood by one of ordinary skill in the art to which the present invention belongs. Terms such as those defined in commonly used dictionaries are to be interpreted as having meanings consistent with the meanings of the context in the relevant art and are not to be construed in an ideal or overly formal sense unless expressly defined in the present specification.

In FIG. 1, a flowchart regarding the zinc coating-forming method for drawing of metallic pipes according to an embodiment of the present invention is illustrated.

Referring to the drawing, the zinc coating-forming method for drawing of metallic pipes includes a degreasing step S110, a first oxidation step S120, a second oxidation step 130, a borax application step 140, and a lube step 150.

The degreasing step S110 is a step of degreasing a material to be drawn, which consists of any one of aluminum, an aluminum alloy, copper, and a copper alloy. In this case, the material to be drawn may be formed as a round bar having a predetermined length. An operator prepares the material to be drawn and a degreasing bath containing a degreasing agent including ethylene diamine tetra acetic acid (EDTA) and potassium hydroxide, and immerses the material to be drawn in the degreasing agent for approximately 10 seconds.

In this case, the degreasing agent consists of 10 wt % to 15 wt % of the EDTA, 2 wt % to 4 wt % of the potassium hydroxide, 10 wt % to 15 wt % of a surfactant, with the remainder as water, and has a temperature of 60° C. to 70° C. In this case, it is preferable that water in the degreasing agent is 66 wt % to 78 wt %.

Oil material remaining on a surface of the material to be drawn is removed by the degreasing agent described above. In this case, oil material remaining on a surface of a material to be drawn, composed of aluminum, an aluminum alloy, copper, and a copper alloy, is more easily removed by EDTA and potassium hydroxide included in the degreasing agent.

Meanwhile, although a water washing process may be further included after the degreasing step S110, since the water washing process is a process commonly used in the conventional plating field, a detailed description thereof will be omitted.

The first oxidation step S120 is a step of forming an oxide coating on a surface of a material to be drawn, which has been degreased in the degreasing step S110. In the first oxidation step S120, an oxide coating is formed on the material to be drawn by anodic oxidation, and a first container preparation step, a first setting step, and a first coating formation step are included.

The first container preparation step is a step of preparing a first container containing a first electrolyte containing sulfuric acid ($H_2SO_4$). The first container is formed to have a length of 8 m to 10 m so that it may contain a material to be drawn having a length of approximately 6 m.

In this case, the first electrolyte consists of 20 wt % to 30 wt % of the sulfuric acid with the remainder as water, and has a temperature of 50° C. to 60° C. In this case, it is preferable that the first electrolyte includes 70 wt % to 80 wt % water. Further, on one side of the first container, a heating device may be installed to maintain the temperature of the first electrolyte at 50° C. to 60° C. The heating device may include a first temperature sensor installed in a first container to measure the temperature of a first electrolyte, a first heating element installed in the first container, and a first control unit for operating the first heating element so that the first electrolyte is maintained at a temperature of 50° C. to 60° C. based on measured data through the first temperature sensor.

The first setting step is a step of installing a first electrode and a material to be drawn so as to be immersed in a first electrolyte, in a first container. In this case, for the first electrode, titanium or platinum may be applied as a conductive material.

The first coating formation step is a step of forming an oxide coating on a material to be drawn by applying a voltage of a negative electrode to a first electrode installed in a first container and applying a voltage of a positive electrode to the material to be drawn. A voltage supply means is connected to the first electrode and the material to be drawn, respectively, and voltages of mutually opposite polarities are applied. In this case, a voltage application time is preferably 10 seconds to 5 minutes. Here, an oxide coating is formed on a surface of the material to be drawn, which is a positive electrode, by sulfuric acid of the first electrolyte.

Meanwhile, although a water washing process may be further included after the first oxidation step S120, since the water washing process is a process commonly used in the conventional plating field, a detailed description thereof will be omitted.

The second oxidation step 130 is a step of forming a zinc coating on a material to be drawn which has been coated with an oxide. In this case, in the second oxidation step 130, a zinc coating is formed on the material to be drawn by anodic oxidation, and an electrolytic bath preparation step, an installation step, and a voltage application step are included.

The electrolytic bath preparation step is a step of preparing an electrolytic bath containing a coating agent including phosphoric acid and zinc. The electrolytic bath is formed to have a length of 8 m to 10 m to contain a material to be drawn having a length of approximately 6 m.

In this case, the coating agent consists of 20 wt % to 30 wt % phosphoric acid ($H_3PO_4$), 5 wt % to 10 wt % zinc oxide (ZnO), 10 wt % to 15 wt % nitric acid ($HNO_3$), with the remainder as water, and has a temperature of 65° C. to 75° C. In this case, the coating agent preferably includes 45 wt % to 65 wt % water. Further, the coating agent has a total acidity (TA) of 35 points to 40 points, a free acidity (FA) of 4.5 to 5.5, a pH value of 6 to 7, and a degree of acceleration of 1.0 to 1.5.

The total acidity (TA) represents the residual amount of acidic components contained in a coating agent, and it refers to the number of cc of NaOH required for neutralization, when 10 cc of a coating agent is sampled and titrated with 0.1 N NaOH using phenolphthalein (P.P) as an indicator.

The free acidity (FA) represents the concentration of free acids contained in a coating agent, and it refers to the number of cc of NaOH required for neutralization, when 10 cc of a coating agent is sampled and titrated with 0.1 N NaOH using bromphenol blue (B.P.B) as an indicator. When the free acidity is higher than 5.5, etching time is prolonged, thereby increasing conversion time, and also the content of a tertiary phosphate in a zinc coating is reduced, thereby reducing corrosion resistance. When the free acidity is lower than 4.5, corrosion resistance is reduced due to insufficient etching time, and since a precipitate is generated not only in the vicinity of a material to be drawn but also throughout the entire coating agent, a large amount of the material to be drawn can be lost as muddy material.

Meanwhile, in order to prevent hydrogen gas, which is generated when a voltage is applied to the conductive plate and the material to be drawn which are immersed in the coating agent, from interfering with the formation of the zinc coating, an accelerant may be added to the coating agent to remove the hydrogen gas in the coating agent. In this case, the accelerant includes sodium nitrite ($NaNO_2$) and sodium phosphate ($Na_3H_2PO_4$) and consists of 30 wt % to 40 wt % sodium nitrite, 5 wt % to 10 wt % sodium phosphate, with the remainder as water. In this case, it is preferable that the accelerant includes 50 wt % to 65 wt % water. The accelerator removes the hydrogen gas generated in the coating agent during the voltage application step described below to more stably form a zinc coating on a material to be drawn.

Meanwhile, a heating device may be installed on one side of an electrolytic bath to maintain the coating agent at a temperature of 65° C. to 75° C. The heating device may include a second temperature sensor installed in an electrolytic bath to measure the temperature of a coating agent, a second heating element installed in the electrolytic bath, and a second control unit for operating the second heating element so that the coating agent is maintained at a temperature of 65° C. to 75° C. based on measured data through the second temperature sensor.

The installation step is a step of installing a conductive plate and a material to be drawn so as to be immersed in a coating agent, in an electrolytic bath. In this case, for the conductive plate, titanium or platinum may be applied as a conductive material.

The voltage application step is a step of applying a voltage of a negative electrode to a conductive plate installed in an electrolytic bath and applying a voltage of a positive electrode to the material to be drawn to form a zinc coating on a material to be drawn. A voltage supply means is connected to the conductive plate and the material to be drawn, respectively, and voltages of mutually opposite polarities are applied. In this case, a voltage application time is preferably 10 seconds to 5 minutes. Here, a zinc coating is formed on a surface of the material to be drawn, which is a positive electrode, by phosphate-based zinc of the coating agent. Here, since an oxide coating is provided on a surface of the material to be drawn before the second oxidation step 130, a zinc coating can be more easily formed on the material to be drawn.

Meanwhile, although a water washing process may be further included after the second oxidation step 130, since the water washing process is a process commonly used in the conventional plating field, a detailed description thereof will be omitted.

The borax application step 140 is a step of applying borax on a surface of the material to be drawn between the second oxidation step 130 and the lube step 150. An operator prepares a container containing borax in the inside thereof, and applies borax to the material to be drawn, which has been coated with zinc, at room temperature. In this case, it is preferable to immerse a material to be drawn in borax contained in a container so that borax is uniformly applied to the material to be drawn. It is preferable that the borax application step 140 proceeds for approximately 10 seconds. The borax application step 140 is a pretreatment step for the lube step 150 so that a lubricant of the lube step 150 described below is easily contained on a surface of the material to be drawn.

The lube step 150 is a step of lubricating the material to be drawn, which has been coated with zinc. In this case, an operator prepares the material to be drawn, which has been coated with zinc, and a lubrication container containing a lubricant including stearic acid ($C_{18}H_{36}O_2$) and caustic soda (NaOH) and immerses the material to be drawn, which has been coated with zinc, in the lubricant for 1 minute to 5 minutes. The lubricant is contained on the oxide coating and zinc coating formed on the material to be drawn, thereby reducing friction with a die during a drawing process.

As described above, in the zinc coating-forming method for drawing of metallic pipes according to the present invention, a material to be drawn is degreased before the formation of a zinc coating and an oxide coating is formed on a surface thereof by sulfuric acid so that a phosphate-based zinc coating can be formed more stably on a surface of a material to be drawn, and the zinc coating can be subjected to a lube process so that there is an advantage in that no separate oil supply means is required for drawing dies.

Figure 2:
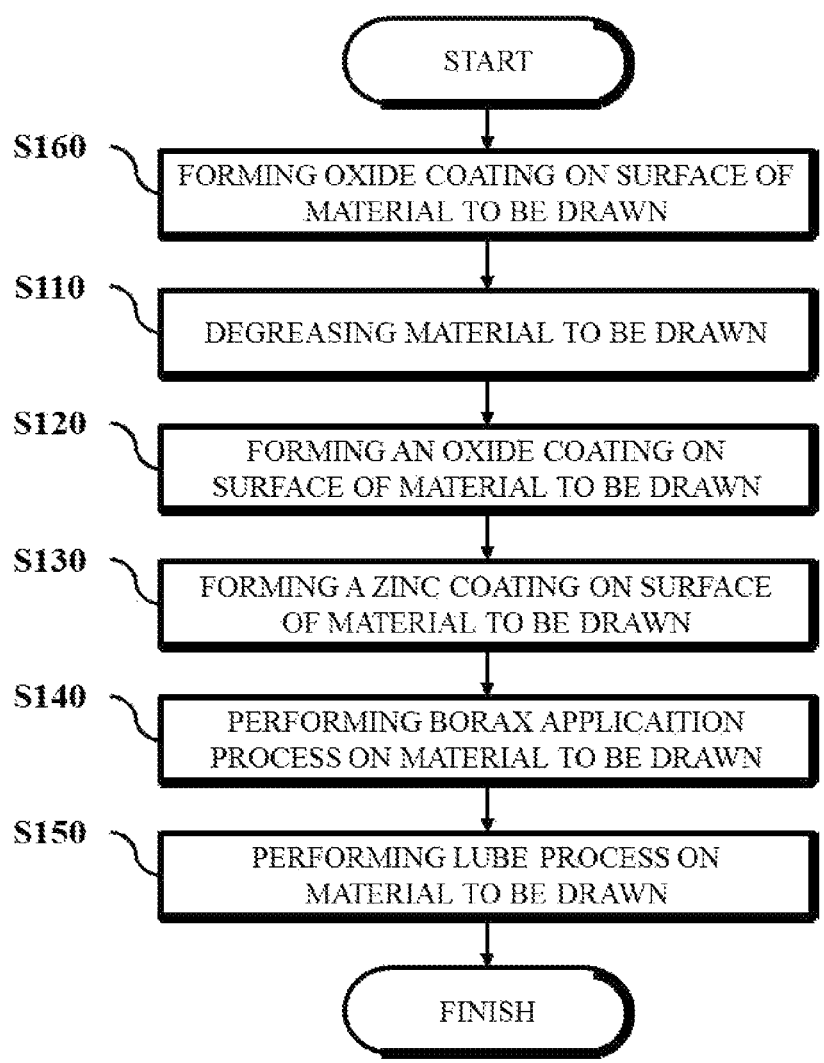
FIG. 2 is a flowchart illustrating the zinc coating-forming method for drawing of metallic pipes according to another exemplary embodiment of the present invention.

Meanwhile, FIG. 2 shows a flowchart regarding the zinc coating-forming method for drawing of metallic pipes according to another exemplary embodiment of the present invention. Elements having the same functions as those shown in the previous drawing are denoted by the same reference numerals.

Referring to the drawing, the zinc coating-forming method for drawing of metallic pipes includes a pretreatment step S160, a degreasing step S110, a first oxidation step S120, a second oxidation step 130, a borax application step 140, and a lube step 150. Since the degreasing step S110, first oxidation step S120, second oxidation step 130, borax application step 140, and lube step 150 are identical to the degreasing step S110, first oxidation step S120, second oxidation step 130, borax application step 140, and lube step 150, respectively, according to an exemplary embodiment of FIG. 1, a detailed description thereof will be omitted.

The pretreatment step S160 is a step of forming an oxide coating on a surface of the material to be drawn, before the degreasing step S110. In the pretreatment step S160, an oxide coating is formed on the material to be drawn according to anodic oxidation, and a second container preparation step, a second setting step, and a second coating formation step are included.

The second container preparation step is a step of preparing a second container containing a second electrolyte including sulfuric acid ($H_2SO_4$). The second container is formed to have a length of 8 m to 10 m so that it may contain a material to be drawn having a length of approximately 6 m.

In this case, it is preferable that the second electrolyte consists of 20 wt % to 30 wt % of the sulfuric acid with the remainder as water (please check a material, a ratio, and a unit), and has a temperature of 50° C. to 60° C. Further, on one side of the second container, a heating device may be installed to maintain the temperature of the second electrolyte at 50° C. to 60° C. The heating device may include a third temperature sensor installed in a second container to measure the temperature of a second electrolyte, a third heating element installed in the second container, and a third control unit for operating the third heating element so that the second electrolyte is maintained at a temperature of 50° C. to 60° C. based on measured data through the third temperature sensor.

The second setting step is a step of installing a second electrode and a material to be drawn so as to be immersed in a second electrolyte, in a second container. In this case, for the second electrode, titanium or platinum may be applied as a conductive material.

The second coating formation step is a step of forming an oxide coating on a material to be drawn by applying a voltage of a negative electrode to a second electrode installed in a second container and applying a voltage of a positive electrode to the material to be drawn. A voltage supply means is connected to the second electrode and the material to be drawn, respectively, and voltages of mutually opposite polarities is applied. In this case, a voltage application time is preferably 10 seconds to 5 minutes. Here, an oxide coating is formed on a surface of the material to be drawn, which is a positive electrode, by sulfuric acid of the second electrolyte.

Meanwhile, although a water washing process may be further included after the pretreatment step S160, since the water washing process is a process commonly used in the conventional plating field, a detailed description thereof will be omitted.

As described above, an oxide coating is formed on a surface of a material to be drawn through the pretreatment step S160 before the degreasing step S110, and an oxide coating is formed again on a surface of the material to be drawn through the first oxidation step S120 after the degreasing step S110, thus, since multiple oxide coatings are uniformly stacked on the surface of the material to be drawn, corrosion resistance is improved and there is an advantage in that operation efficiencies of the second oxidation step 130 and the lube step 150 are further improved.

The description of the disclosed embodiments is provided to enable any person skilled in the art to make or use the invention. Various modifications to these embodiments will be readily apparent to those skilled in the art, and the generic principles defined herein may be applied to other embodiments without departing from the scope of the present invention. Thus, the present invention is not intended to be limited to the embodiments shown herein but is to be accorded the widest scope consistent with the principles and novel features set forth herein.

EXPLANATION OF REFERENCE NUMERALS

S110: Degreasing step
S120: First oxidation step
S130: Second oxidation step
S140: Borax application step
S150: Lube step

What is claimed is:
1. A zinc coating-forming method for drawing of metallic pipes, comprising:
a degreasing step of degreasing a material to be drawn, which consists of any one of aluminum, an aluminum alloy, copper, and a copper alloy;
a first oxidation step of forming a first oxide coating on a surface of the material to be drawn, which has been degreased in the degreasing step;

a second oxidation step of forming a zinc coating on the material to be drawn which has been covered by the first oxide coating;

a borax application step of applying borax on a surface of the zinc coated material; and a lube step of lubricating the zinc coated material with the borax applied surface.

2. The zinc coating-forming method of claim 1, wherein the degreasing step is carried out by immersing the material to be drawn in a degreasing agent including ethylene diamine tetra acetic acid and potassium hydroxide for a predetermined immersion time.

3. The zinc coating-forming method of claim 2, wherein the degreasing agent consists of 10 wt % to 15 wt % of the ethylene diamine tetra acetic acid, 2 wt % to 4 wt % of the potassium hydroxide, 10 wt % to 15 wt % of a surfactant, with the remainder as water.

4. The zinc coating-forming method of claim 1, wherein the second oxidation step is carried out by forming the zinc coating on the material to be drawn by anodic oxidation.

5. The zinc coating-forming method of claim 4, wherein the second oxidation step comprises:

an electrolytic bath preparation step of preparing an electrolytic bath containing a coating agent including phosphoric acid and zinc;

an installation step of installing a conductive plate and the material to be drawn so as to be immersed in the coating agent, in the electrolytic bath; and a voltage application step of applying a voltage of a negative electrode to the conductive plate installed in the electrolytic bath and applying a voltage of a positive electrode to the material to be drawn to form the zinc coating on the material to be drawn.

6. The zinc coating-forming method of claim 5, wherein the coating agent consists of 20 wt % to 30 wt % phosphoric acid ($H_3PO_4$), 5 wt % to 10 wt % zinc oxide (ZnO), 10 wt % to 15 wt % nitric acid ($HNO_3$), with the remainder as water.

7. The zinc coating-forming method of claim 5, wherein, in order to prevent hydrogen gas, which is generated when a voltage is applied to the conductive plate and the material to be drawn which are immersed in the coating agent, from interfering with formation of the zinc coating, an accelerant is added to the coating agent in the electrolytic bath preparation step to remove the hydrogen gas in the coating agent.

8. The zinc coating-forming method of claim 7, wherein the accelerant comprises sodium nitrite ($NaNO_2$) and sodium phosphate ($Na_3H_2PO_4$).

9. The zinc coating-forming method of claim 7, wherein the accelerant consists of 30 wt % to 40 wt % sodium nitrite, 5 wt % to 10 wt % sodium phosphate, with the remainder as water.

10. The zinc coating-forming method of claim 1, wherein the first oxidation step is carried out by forming the first oxide coating on the material to be drawn by anodic oxidation.

11. The zinc coating-forming method of claim 10, wherein the first oxidation step comprises:

a first container preparation step of preparing a first container containing a first electrolyte including sulfuric acid;

a first setting step of installing a first electrode and the material to be drawn so as to be immersed in the first electrolyte, in the first container; and a first coating formation step of forming the first oxide coating on the material to be drawn by applying a voltage of a negative electrode to the first electrode installed in the first container and applying a voltage of a positive electrode to the material to be drawn.

12. The zinc coating-forming method of claim 1, further comprising a pretreatment step of forming a second oxide coating on a surface of the material to be drawn, before the degreasing step.

13. The zinc coating-forming method of claim 12, wherein the pretreatment step comprises:

before the degreasing step, a second container preparation step of preparing a second container containing a second electrolyte including sulfuric acid;

a second setting step of installing a second electrode and the material to be drawn so as to be immersed in the second electrolyte, in the second container; and a second coating formation step of forming the second oxide coating on the material to be drawn by applying a voltage of a negative electrode to the second electrode installed in the second container and applying a voltage of a positive electrode to the material to be drawn.

14. The zinc coating-forming method of claim 1, wherein the lube step is carried out by immersing the zinc coated material with the borax applied surface, in a lubricant including stearic acid ($C_{18}H_{36}O_2$) and caustic soda (NaOH) for a predetermined time.

15. The zinc coating-forming method of claim 14, wherein the lubricant consists of 10 wt % to 20 wt % of the stearic acid, 5 wt % to 7 wt % of the caustic soda, 10 wt % to 20 wt % borax ($Na_2B_4O_7 \cdot 10H_2O$), with the remainder as water.

* * * * *